US010975216B2

(12) United States Patent
Nappa et al.

(10) Patent No.: US 10,975,216 B2
(45) Date of Patent: *Apr. 13, 2021

(54) COMPOSITIONS COMPRISING Z-1,1,1,4,4,4-HEXAFLUORO-2-BUTENE AND USES THEREOF

(71) Applicant: THE CHEMOURS COMPANY FC, LLC, Wilmington, DE (US)

(72) Inventors: Mario Joseph Nappa, Leesburg, FL (US); Xuehui Sun, Kennett Square, PA (US); Ivan Sergeyevich Baldychev, Wilmington, DE (US); Sheng Peng, Hockessin, DE (US); Konstantinos Kontomaris, Wilmington, DE (US); Barbara Haviland Minor, Elkton, MD (US); Joseph Anthony Creazzo, Wilmington, DE (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 133 days.

This patent is subject to a terminal disclaimer.

(21) Appl. No.: 15/546,000

(22) PCT Filed: Feb. 3, 2016

(86) PCT No.: PCT/US2016/016327
§ 371 (c)(1),
(2) Date: Jul. 24, 2017

(87) PCT Pub. No.: WO2016/126792
PCT Pub. Date: Aug. 11, 2016

(65) Prior Publication Data
US 2018/0002506 A1  Jan. 4, 2018

Related U.S. Application Data

(60) Provisional application No. 62/113,246, filed on Feb. 6, 2015, provisional application No. 62/153,583, filed on Apr. 28, 2015.

(51) Int. Cl.
C08J 9/14 (2006.01)
C08K 3/30 (2006.01)
C09K 5/04 (2006.01)
C09K 3/30 (2006.01)

(52) U.S. Cl.
CPC ............ *C08J 9/143* (2013.01); *C09K 3/30* (2013.01); *C09K 5/045* (2013.01); *C08J 2203/142* (2013.01); *C08J 2203/162* (2013.01); *C08J 2203/182* (2013.01); *C08J 2203/202* (2013.01); *C09K 2205/12* (2013.01); *C09K 2205/122* (2013.01); *C09K 2205/126* (2013.01); *C09K 2205/22* (2013.01); *C09K 2205/40* (2013.01)

(58) Field of Classification Search
CPC ...... C08J 9/143; C08J 9/144; C08J 2203/142; C08J 2203/162; C09K 2205/122
See application file for complete search history.

(56) References Cited

U.S. PATENT DOCUMENTS

| | | | | |
|---|---|---|---|---|
| 4,587,273 A | * | 5/1986 | Shimomura | C08K 3/34 521/107 |
| 7,862,742 B2 | * | 1/2011 | Minor | A62D 1/0057 252/68 |
| 2008/0069177 A1 | | 3/2008 | Minor et al. | |
| 2008/0269532 A1 | | 10/2008 | Swearingen | |
| 2009/0012335 A1 | | 1/2009 | Nappa et al. | |
| 2010/0078585 A1 | * | 4/2010 | Robin | A62D 1/0057 252/2 |
| 2010/0160696 A1 | | 6/2010 | Nappa et al. | |
| 2010/0174123 A1 | | 7/2010 | Sievert et al. | |
| 2011/0218621 A1 | | 9/2011 | Loh et al. | |
| 2012/0085959 A1 | | 4/2012 | Uenveren et al. | |
| 2012/0104307 A1 | | 5/2012 | Bogdan et al. | |
| 2012/0108688 A1 | | 5/2012 | Van Horn et al. | |
| 2012/0323054 A1 | | 12/2012 | Knapp | |
| 2013/0104573 A1 | | 5/2013 | Kontomaris | |
| 2013/0119292 A1 | | 5/2013 | Robin et al. | |
| 2014/0070129 A1 | * | 3/2014 | Kennoy | C09K 3/30 252/2 |
| 2014/0100299 A1 | | 4/2014 | Taylor | |

(Continued)

FOREIGN PATENT DOCUMENTS

| | | | |
|---|---|---|---|
| WO | WO0226913 A2 | * | 4/2002 |
| WO | 2009/117458 A2 | | 9/2009 |
| WO | 2009/155490 A1 | | 12/2009 |

(Continued)

OTHER PUBLICATIONS

International Search Report and Written Opinion dated Jul. 26, 2016.

(Continued)

*Primary Examiner* — Melissa A Rioja

(57) ABSTRACT

The present disclosure relates to compositions comprising Z-1,1,1,4,4,4-hexafluoro-2-butene and additional compounds that may be useful as refrigerants, heat transfer compositions, aerosol propellants, foaming agents, blowing agents, solvents, cleaning agents, carrier fluids, displacement drying agents, buffing abrasion agents, polymerization media, expansion agents for polyolefins and polyurethane, gaseous dielectrics, power cycle working fluids, extinguishing agents, and fire suppression agents in liquid or vapor form.

15 Claims, No Drawings

(56) References Cited

U.S. PATENT DOCUMENTS

2014/0174084 A1* 6/2014 Kontomaris ............ F01K 25/10
60/651
2016/0009847 A1* 1/2016 Van Der Puy ............. C08J 9/02
521/110

FOREIGN PATENT DOCUMENTS

| WO | 2012/067864 A1 | 5/2012 |
| WO | 2014/028697 A1 | 2/2014 |
| WO | 2014/047112 A1 | 3/2014 |

OTHER PUBLICATIONS

Papadimitriou et al., $CF_3CF=CH_2$ and (Z)-$CF_3CF=CHF$: temperature dependent OH rate coefficients and global warming potentials, Physical Chemistry Chemical Physics, 2007, pp. 1-13, vol. 9.

* cited by examiner

COMPOSITIONS COMPRISING Z-1,1,1,4,4,4-HEXAFLUORO-2-BUTENE AND USES THEREOF

FIELD OF THE INVENTION

The present disclosure relates to the field of compositions which may be useful as refrigerants, heat transfer compositions, thermodynamic cycle (e.g. heating or cooling cycle) working fluids, aerosol propellants, foaming agents (blowing agents), solvents, cleaning agents, carrier fluids, displacement drying agents, buffing abrasion agents, polymerization media, foaming agents for polyolefins and polyurethane, gaseous dielectrics, power cycle working fluids, fire extinguishing agents, and fire suppression agents in liquid or gaseous form.

BACKGROUND OF THE INVENTION

New environmental regulations have led to the need for new compositions for use in refrigeration, air-conditioning, heat pump and power cycle apparatus and many other areas of use. Low global warming potential compounds are of particular interest.

SUMMARY OF THE INVENTION

Applicants have found that in preparing such new low global warming potential compounds, such as 1,1,1,4,4,4-hexafluoro-2-butene, that certain additional compounds are present.

Therefore, in accordance with the present invention, there is provided a composition comprising Z-1,1,1,4,4,4-hexafluoro-2-butene and at least one additional compound selected from the group consisting of HFO-1243zf, HCC-40, HCFO-1223, CFC-113a, CFC-113, HFO-1429, HFC-449, HFC-365, HFO-1327, HFO-1132, HCFC-123a, chlorobutane, ethyl benzene, o-xylene, m-xylene, and p-xylene. The composition may contain less than about 1 weight percent of the at least one additional compound, based on the total weight of the composition.

DETAILED DESCRIPTION

Compositions

Z-1,1,1,4,4,4-hexafluoro-2-butene (Z-HFO-1336mzz) has been suggested for use as a refrigerant, heat transfer fluid, foam expansion agent, power cycle working fluid, among other uses. It has also, advantageously, been found that Z-HFO-1336mzz has a low global warming potential (GWP) as reported by V. C. Papadimitriou, et al. in *Physical Chemistry Chemical Physics*, 2007, volume 9, pages 1-13. Thus, Z-HFO-1336mzz is a good candidate for replacing some of the higher GWP saturated CFC (chlorofluorocarbon), HCFC (hydrochlorofluorocarbon), or HFC (hydrofluorocarbon) refrigerants.

Z-1,1,1,4,4,4-hexafluoro-2-butene (also known as Z-HFO-1336mzz or cis-HFO-1336mzz and having the structure cis-$CF_3CH=CHCF_3$), may be made by methods known in the art, such as by hydrodechlorination of 2,3-dichloro-1,1,1,4,4,4-hexafluoro-2-butene, as described in U.S. Patent Application Publication No. US 2009/0012335A1, incorporated herein by reference.

In one embodiment, the present disclosure provides a composition comprising Z-HFO-1336mzz and at least one additional compound selected from the group consisting of HFO-1243zf (3,3,3-trifluoropropene), HCC-40 (chloromethane, $CH_3Cl$), HCFO-1223 ($C_3HF_3Cl_2$), CFC-113a ($CF_3CCl_3$), CFC-113 ($CF_2ClCCl_2F$), HFO-1429 ($C_5HF_9$), HFC-449 ($C_5H_3F_9$), HFC-365 ($C_4H_5F_5$), HFO-1327 ($C_4HF_7$), HFO-1132 (CHFCHF), HCFC-123a (CHClFCClF$_2$), chlorobutane, ethyl benzene, o-xylene, m-xylene, p-xylene, HCFO-1334 ($C_4H_2F_4Cl_2$), HCFO-1333 ($C_4H_2F_3Cl_3$), CFC-11 (trichlorofluoromethane, $CFCl_3$), and combinations thereof. HFO-1243zf, HCC-40, CFC-113, CFC-113a, CFC-11, chlorobutane, ethylbenzene, m-xylene, and p-xylene are available commercially or can be made by processes known in the art. The remaining fluorocarbon compounds can be purchased from a specialty fluorochemical supplier, such as SynQuest Laboratories, Inc. (Alachua, Fla. USA) or made by processes known in the art.

The compositions of the present invention may comprise Z-HFO-1336mzz and one additional compound, or two additional compounds, or three or more additional compounds.

In one embodiment, the total amount of additional compound(s) in the composition comprising Z-HFO-1336mzz ranges from greater than zero weight percent to less than 1.0 weight percent, based on the total weight of the composition. In another embodiment, the total amount of additional compound(s) ranges from greater than zero weight percent to less than 0.5 weight percent, based on the total weight of the composition. In another embodiment, the total amount of additional compound(s) ranges from 0.001 weight percent to about 1 weight percent. In another embodiment, the total amount of additional compound(s) ranges from 0.01 ppm (weight) to about 1 weight percent. In another embodiment, the total amount of additional compound(s) ranges from 0.1 ppm(weight) to about 1 weight percent. In another embodiment, the total amount of additional compound(s) ranges from 0.001 weight percent to about 1 weight percent. In another embodiment, the total amount of additional compound(s) ranges from 0.001 weight percent to about 0.5 weight percent.

In one embodiment, the compositions comprising Z-HFO-1336mzz and other compounds may further comprise at least one tracer compound. The inclusion of tracer compounds is useful to determine the occurrence of dilution, adulteration or contamination; or to verify the source of the composition. The tracer compound(s) may be selected from the group consisting of HFC-356 (e.g., HFC-356mff), HCFC-123 (2,2-dichloro-1,1,1-trifluoroethane, $CF_3CHCl_2$), HCFC-133a (2-chloro-1,1,1-trifluoroethane, $CF_3CH_2Cl$), HFC-143a (1,1,1-trifluoroethane, $CF_3CH_3$), HCFO-1122 (1-chloro-2,2-difluoroethene, $CF_2=CHCl$), HCFO-1122a (1-chloro-1,2-difluoroethene, $CFH=CFCl$), HCFO-1335 ($C_4H_2F_5Cl$), HFO-1345 ($C_4H_3F_5$), HCFO-1326 ($C_4HF_6Cl$), CFO-1316 ($C_4F_6Cl_2$), or combinations thereof. In this embodiment, the tracer compound(s) may be present at a concentration from about 0.01 part per million (ppm) to about 1000 ppm in the composition. In another embodiment, the tracer compound(s) may be present at a concentration from about 0.01 ppm to about 500 ppm. In another embodiment, the tracer compound(s) may be present at a concentration from about 0.1 ppm to about 500 ppm. In another embodiment, the tracer compound(s) may be present at a concentration from about 1 ppm to about 500 ppm. In another embodiment, the tracer compound(s) may be present at a concentration from about 10 ppm to about 500 ppm. Alternatively, the tracer compound(s) may be present at a concentration from about 10 ppm to about 300 ppm.

In another embodiment, the compositions of the present invention comprise a composition selected from the group consisting of:

Z-HFO-1336mzz, HFO-1429, and HCFO-1335;
Z-HFO-1336mzz, HFO-1429, and HFO-1345;
Z-HFO-1336mzz, HFO-1429, and HCFC-123;
Z-HFO-1336mzz, HFO-1429, and CFC-11;
Z-HFO-1336mzz, HFO-1429, HCFO-1335, and HFO-1345;
Z-HFO-1336mzz, HFO-1429, HCFO-1335, and HCFC-123;
Z-HFO-1336mzz, HFO-1429, HCFO-1335, and CFC-11;
Z-HFO-1336mzz, HFO-1429, HFO-1345, and HCFC-123;
Z-HFO-1336mzz, HFO-1429, HFO-1345, and CFC-11;
Z-HFO-1336mzz, HFO-1429, HCFO-1335, HFO-1345, and HCFC-123;
Z-HFO-1336mzz, HCFO-1335, and HFO-1345;
Z-HFO-1336mzz, HCFO-1335, and HCFC-123;
Z-HFO-1336mzz, HCFO-1335, and CFC-11;
Z-HFO-1336mzz, HCFO-1335, and HCFO-1334;
Z-HFO-1336mzz, HCFO-1335, HFO-1345, and HCFC-123;
Z-HFO-1336mzz, HFO-1345, and HCFC-123;
Z-HFO-1336mzz, HFO-1345, and CFC-11;
Z-HFO-1336mzz, HFC-365, and HCFO-1326;
Z-HFO-1336mzz, HFC-365, and CFC-11;
Z-HFO-1336mzz, HFO-1243zf, and HCFO-1122;
Z-HFO-1336mzz, HFO-1243zf, and HCC-40;
Z-HFO-1336mzz, HCFO-1122, and HCC-40;
Z-HFO-1336mzz, HFO-1243zf, HCFO-1122, and HCC-40;
Z-HFO-1336mzz, CFC-113a, and HFC-365; and
Z-HFO-1336mzz, CFC-113a, and CFC-11.

In one embodiment of the compositions disclosed herein HFO-356 is HFO-356mff (1,1,1,4,4,4-hexafluorobutane, or $CF_3CH_2CH_2CF_3$).

In one embodiment of the compositions disclosed herein CFO-1316 is E-CFO-1316mxx (E-$CF_3CCl=CClCF_3$), Z—CFO-1316mxx (Z—$CF_3CCl=CClCF_3$), or combinations thereof.

In one embodiment of the compositions disclosed herein HFO-1327 is E-HFO-1327mzx (E-$CF_3CH=CFCF_3$), Z-HFO-1327mzx (Z—$CF_3CH=CFCF_3$), or combinations thereof.

In one embodiment of the compositions disclosed herein HCFO-1335 is HCFO-1335mzz ($CF_3CH=CHCF_2Cl$), HCFO-1335mzx, ($CF_3CH=CClCF_2H$), or combinations thereof. In another embodiment, HCFO-1335 is E-HCFO-1335mzz, Z-HFO-1335mzz, or combinations thereof. In another embodiment, HCFO-1335 is E-HCFO-1335mzx, Z—HCFO-1335mzx or combinations thereof.

In one embodiment of the compositions disclosed herein HFO-1345 is HFO-1345mzz ($CF_3CH=CHCF_2H$), HFO-1345cm ($CF_3(CH_3)C=CF_2$), or combinations thereof. In another embodiment, HFO-1345 is E-HFO-1345mzz or Z-HFO-1345mzz. In another embodiment HFO-1345 is HFO-1345cm.

In one embodiment of the compositions disclosed herein HCFO-1326 is E-HCFO-1326mxz (E-$CF_3CCl=CHCF_3$), Z—HCFO-1326mxz (Z—$CF_3CCl=CHCF_3$), or combinations thereof.

In one embodiment of the compositions disclosed herein HFO-1429 is HFO-1429mzy ($CF_3CH=CFCF_2CF_3$), HFO-1429myz ($CF_3CF=CHCF_2CF_3$), HFO-1429cz ($CF_2=CHCF_2CF_2CF_3$), HFO-1429cye ($CF_2=CFCHFCF_2CF_3$), or combinations thereof. In another embodiment, HFO-1429 is E-HFO-1429mzy or Z-HFO-1429mzy. In another embodiment, HFO-1429 is E-HFO-1429myz or Z-HFO-1429myz. In another embodiment HFO-1429 is HFO-1429cz. In another embodiment, HFO-1429 is HFO-1429cye.

In one embodiment of the compositions disclosed herein HFC-449 is HFC-449mfe ($CF_3CF_2CHFCH_2CF_3$), HFC-449mmzf (($CF_3)_2CHCH_2CF_3$), or combinations thereof. In another embodiment, HFC-449 is HFC-449mfe. In another embodiment, HFC-449 is HFC-449mmzf.

In one embodiment of the compositions disclosed herein HCFO-1223 is HCFO-1223za ($CF_3CH=CCl_2$).

In one embodiment of the compositions disclosed herein HFO-356 is HFO-356mff (1,1,1,4,4,4-hexafluorobutane, or $CF_3CH_2CH_2CF_3$).

In one embodiment of the compositions disclosed herein chlorobutane is 1-chlorobutane, 2-chlorobutane, or combinations thereof.

In one embodiment of the compositions disclosed herein HCFO-1334 is E-HCFO-1334mzz (E-$CF_3CH=CHCFCl_2$), Z—HCFO-1334mzz (Z—$CF_3CH=CHCFCl_2$), or combinations thereof.

In one embodiment of the compositions disclosed herein HCFO-1333 is E-HCFO-1333mzz (E-$CF_3CH=CHCCl_3$), Z—HCFO-1333mzz (Z—$CF_3CH=CHCCl_3$), or combinations thereof.

Thus, in another embodiment the compositions of the present invention comprise a composition selected from the group consisting of:
Z-HFO-1336mzz, HFO-1429myz, and HCFO-1335mzz;
Z-HFO-1336mzz, HFO-1429myz, and HFO-1345mzz;
Z-HFO-1336mzz, HFO-1429myz, and HFO-1345cm;
Z-HFO-1336mzz, HFO-1429myz, and HCFC-123;
Z-HFO-1336mzz, HFO-1429myz, and CFC-11;
Z-HFO-1336mzz, HFO-1429myz, HCFO-1335mzz, and HFO-1345mzz;
Z-HFO-1336mzz, HFO-1429myz, HCFO-1335mzz, and HFO-1345cm;
Z-HFO-1336mzz, HFO-1429myz, HCFO-1335mzz, and HCFC-123;
Z-HFO-1336mzz, HFO-1429myz, HCFO-1335mzz, and CFC-11;
Z-HFO-1336mzz, HFO-1429myz, HFO-1345mzz, and HCFC-123;
Z-HFO-1336mzz, HFO-1429myz, HFO-1345mzz, and CFC-11;
Z-HFO-1336mzz, HFO-1429myz, HFO-1345cm, and HCFC-123;
Z-HFO-1336mzz, HFO-1429myz, HFO-1345cm, and CFC-11;
Z-HFO-1336mzz, HFO-1429myz, HCFO-1335mzz, HFO-1345mzz, and HCFC-123;
Z-HFO-1336mzz, HFO-1429myz, HCFO-1335mzz, HFO-1345cm, and HCFC-123;
Z-HFO-1336mzz, HFO-1429mzy, and HCFO-1335mzz;
Z-HFO-1336mzz, HFO-1429mzy, and HFO-1345mzz;
Z-HFO-1336mzz, HFO-1429mzy, and HFO-1345cm;
Z-HFO-1336mzz, HFO-1429mzy, and HCFC-123;
Z-HFO-1336mzz, HFO-1429mzy, and CFC-11;
Z-HFO-1336mzz, HFO-1429mzy, HCFO-1335mzz, and HFO-1345mzz;
Z-HFO-1336mzz, HFO-1429mzy, HCFO-1335mzz, and HFO-1345cm;
Z-HFO-1336mzz, HFO-1429mzy, HCFO-1335mzz, and HCFC-123;
Z-HFO-1336mzz, HFO-1429mzy, HCFO-1335mzz, and CFC-11;
Z-HFO-1336mzz, HFO-1429mzy, HFO-1345mzz, and HCFC-123;

Z-HFO-1336mzz, HFO-1429mzy, HFO-1345mzz, and HCFC-11;
Z-HFO-1336mzz, HFO-1429mzy, HFO-1345cm, and HCFC-123;
Z-HFO-1336mzz, HFO-1429mzy, HFO-1345cm, and CFC-11;
Z-HFO-1336mzz, HFO-1429mzy, HCFO-1335mzz, HFO-1345mzz, and HCFC-123;
Z-HFO-1336mzz, HFO-1429mzy, HCFO-1335mzz, HFO-1345cm, and HCFC-123;
Z-HFO-1336mzz, HFO-1429cz, and HCFO-1335mzz;
Z-HFO-1336mzz, HFO-1429cz, and HFO-1345mzz;
Z-HFO-1336mzz, HFO-1429cz, and HFO-1345cm;
Z-HFO-1336mzz, HFO-1429cz, and HCFC-123;
Z-HFO-1336mzz, HFO-1429cz, and CFC-11;
Z-HFO-1336mzz, HFO-1429cz, HCFO-1335mzz, and HFO-1345mzz;
Z-HFO-1336mzz, HFO-1429cz, HCFO-1335mzz, and HFO-1345cm;
Z-HFO-1336mzz, HFO-1429cz, HCFO-1335mzz, and HCFC-123;
Z-HFO-1336mzz, HFO-1429cz, HCFO-1335mzz, and CFC-11;
Z-HFO-1336mzz, HFO-1429cz, HFO-1345mzz, and HCFC-123;
Z-HFO-1336mzz, HFO-1429cz, HFO-1345mzz, and CFC-11;
Z-HFO-1336mzz, HFO-1429cz, HFO-1345cm, and HCFC-123;
Z-HFO-1336mzz, HFO-1429cz, HFO-1345cm, and CFC-11;
Z-HFO-1336mzz, HFO-1429cz, HCFO-1335mzz, HFO-1345mzz, and HCFC-123;
Z-HFO-1336mzz, HFO-1429cz, HCFO-1335mzz, HFO-1345cm, and HCFC-123;
Z-HFO-1336mzz, HFO-1429cye, and HCFO-1335mzz;
Z-HFO-1336mzz, HFO-1429cye, and HFO-1345mzz;
Z-HFO-1336mzz, HFO-1429cye, and HFO-1345cm;
Z-HFO-1336mzz, HFO-1429cye, and HCFC-123;
Z-HFO-1336mzz, HFO-1429cye, and CFC-11;
Z-HFO-1336mzz, HFO-1429cye, HCFO-1335mzz, and HFO-1345mzz;
Z-HFO-1336mzz, HFO-1429cye, HCFO-1335mzz, and HFO-1345cm;
Z-HFO-1336mzz, HFO-1429cye, HCFO-1335mzz, and HCFC-123;
Z-HFO-1336mzz, HFO-1429cye, HCFO-1335mzz, and CFC-11;
Z-HFO-1336mzz, HFO-1429cye, HFO-1345mzz, and HCFC-123;
Z-HFO-1336mzz, HFO-1429cye, HFO-1345mzz, and CFC-11;
Z-HFO-1336mzz, HFO-1429cye, HFO-1345cm, and HCFC-123;
Z-HFO-1336mzz, HFO-1429cye, HFO-1345cm, and CFC-11;
Z-HFO-1336mzz, HFO-1429cye, HCFO-1335mzz, HFO-1345mzz, and HCFC-123;
Z-HFO-1336mzz, HFO-1429cye, HCFO-1335mzz, HFO-1345cm, and HCFC-123;
Z-HFO-1336mzz, HCFO-1335mzz, and HFO-1345mzz;
Z-HFO-1336mzz, HCFO-1335mzz, and HFO-1345cm;
Z-HFO-1336mzz, HCFO-1335mzz, and HCFC-123;
Z-HFO-1336mzz, HCFO-1335mzz, and CFC-11;
Z-HFO-1336mzz, HCFO-1335mzz, HFO-1345mzz, and HCFC-123;
Z-HFO-1336mzz, HCFO-1335mzz, HFO-1345cm, and HCFC-123;
Z-HFO-1336mzz, HFO-1345mzz, and HCFC-123;
Z-HFO-1336mzz, HFO-1345mzz, and CFC-11;
Z-HFO-1336mzz, HFO-1345cm, and HCFC-123;
Z-HFO-1336mzz, HFO-1345cm, and CFC-11;
Z-HFO-1336mzz, HFC-365mfc, and HCFO-1326mxz;
Z-HFO-1336mzz, HFC-365mfc, and CFC-11;
Z-HFO-1336mzz, HFO-1243zf, and HCFO-1122;
Z-HFO-1336mzz, HFO-1243zf, and HCFO-1122a;
Z-HFO-1336mzz, HFO-1243zf, and HCC-40;
Z-HFO-1336mzz, HCFO-1122, and HCC-40;
Z-HFO-1336mzz, HCFO-1122a, and HCC-40;
Z-HFO-1336mzz, HFO-1243zf, HCFO-1122, and HCC-40;
Z-HFO-1336mzz, HFO-1243zf, HCFO-1122a, and HCC-40;
Z-HFO-1336mzz, CFC-113a, and HFC-365mfc; and
Z-HFO-1336mzz, CFC-113a, and CFC-11.

The presence of additional compounds and/or tracer compounds in a sample of Z-HFO-1336mzz may be used to identify the process by which the compound was manufactured. Thus, the additional compounds and/or tracer compounds may be used to detect infringement of chemical manufacturing patents claiming the process by which the sample may have been manufactured. Additionally, the additional compounds and/or tracer compounds may be used to identify whether product is produced by the patentee or some other entity, who may infringe product related patents.

Additional compounds and/or tracer compounds may provide improved solubility for active ingredients in an aerosol or polymer constituents of a foam. Additionally, for refrigerant applications, such as use in air conditioning, heat pumps, refrigeration, and power cycles (e.g., organic Rankine cycles), the additional compounds may provide improved solubility with refrigeration lubricants, such as mineral oils, alkylbenzenes, synthetic paraffins, synthetic naphthenes, poly(alpha)olefins, polyol esters (POE), polyalkylene glycols (PAG), polyvinyl ethers (PVE), or perfluoropolyethers (PFPE) or mixtures thereof.

In certain embodiments, additional compounds and/or tracer compounds containing at least one chlorine atom may provide improved solubility for active ingredients in an aerosol or polymer constituents of a foam.

Unsaturated fluorocarbons, such as Z-HFO-1336mzz, exhibit different solubility than other typically used fluorocarbon propellants. Their reduced solubility can make it difficult to produce single phase aqueous homogenous aerosol formulations. The presence of low level chlorinated impurities can improve mixing and ease formulations and use of aerosol products.

Unsaturated fluorocarbons, such as Z-HFO-1336mzz, also exhibit different solubility than other typically used blowing agents. Their reduced solubility can act to help seed small cell growth during the foaming reaction but they can be difficult to mix. The presence of low level chlorinated impurities can improve mixing and foam processing performance without sacrificing the benefits from the lower HFO solubility. Also, the chlorinated compounds typically have lower vapor thermal conductivities and so will impart improved insulating performance to a foam insulation product.

Additionally, for refrigerant applications, such as use in air conditioning, heat pumps, refrigeration, and power cycles (e.g., organic Rankine cycles), the additional compounds containing at least one chlorine atom may provide improved solubility with refrigeration lubricants, such as mineral oils, alkylbenzenes, synthetic paraffins, synthetic naphthenes, poly(alpha)olefins, polyol esters (POE), polyalkylene glycols (PAG), polyvinyl ethers (PVE), or perfluoropolyethers (PFPE) or mixtures thereof.

Further, additional compounds may serve to improve leak detection ability. Leakage of refrigerants may lead to loss of refrigerant from a system, thus increasing cost of operation due to the need to top off refrigerant charge. And even minor loss of refrigerant from a system may impact proper operation. Finally, leakage of refrigerant may lead to excessive environmental contamination. In particular, chlorinated compounds, even at low levels can increase the detectability of refrigerant at the point of a leak. Thus, the system may be repaired or redesigned to prevent refrigerant leakage.

The levels of chlorinated compounds must be kept low, however, because higher levels may create compatibility problems with materials of construction. In aerosols, these compatibility problems may be with the aerosol container (e.g. cans), or with plastic valve parts. In foams, these compatibility problems may be with equipment seals and gaskets. Additionally, in aerosol products interaction of higher levels of chlorinated compounds may cause formulation instability. In foam products, higher levels of chlorinated compounds may soften the foam resulting in dimensional instability and poor strength of the foam.

The compositions disclosed herein comprising Z-HFO-1336mzz are useful as low global warming potential (GWP) heat transfer compositions, refrigerants, power cycle working fluids, aerosol propellants, foaming agents, blowing agents, solvents, cleaning agents, carrier fluids, displacement drying agents, buffing abrasion agents, polymerization media, expansion agents for poly-olefins and polyurethane, gaseous dielectrics, fire extinguishing agents, and fire suppression agents in liquid or gaseous form. The disclosed compositions can act as a working fluid used to carry heat from a heat source to a heat sink. Such heat transfer compositions may also be useful as a refrigerant in a cycle wherein the fluid undergoes a phase change; that is, from a liquid to a gas and back or vice versa.

Examples of heat transfer systems include but are not limited to air conditioners, freezers, refrigerators, heat pumps, water chillers, flooded evaporator chillers, direct expansion chillers, walk-in coolers, heat pumps, mobile refrigerators, mobile air conditioning units and combinations thereof.

In one embodiment, the compositions comprising Z-HFO-1336mzz are useful in mobile heat transfer systems, including refrigeration, air conditioning, or heat pump systems or apparatus. In another embodiment, the compositions are useful in stationary heat transfer systems, including refrigeration, air conditioning, or heat pump systems or apparatus.

As used herein, mobile heat transfer systems refers to any refrigeration, air conditioner, or heating apparatus incorporated into a transportation unit for the road, rail, sea or air. In addition, mobile refrigeration or air conditioner units, include those apparatus that are independent of any moving carrier and are known as "intermodal" systems. Such intermodal systems include "containers' (combined sea/land transport) as well as "swap bodies" (combined road/rail transport).

As used herein, stationary heat transfer systems are systems that are fixed in place during operation. A stationary heat transfer system may be associated within or attached to buildings of any variety or may be stand-alone devices located out of doors, such as a soft drink vending machine. These stationary applications may be stationary air conditioning and heat pumps (including but not limited to chillers, high temperature heat pumps, including trans-critical heat pumps (with condenser temperatures above 50° C., 70° C., 80° C., 100° C., 120° C., 140° C., 160° C., 180° C., or 200° C.), residential, commercial or industrial air conditioning systems, and including window, ductless, ducted, packaged terminal, chillers, and those exterior but connected to the building such as rooftop systems). In stationary refrigeration applications, the disclosed compositions may be useful in high temperature, medium temperature and/or low temperature refrigeration equipment including commercial, industrial or residential refrigerators and freezers, ice machines, self-contained coolers and freezers, flooded evaporator chillers, direct expansion chillers, walk-in and reach-in coolers and freezers, and combination systems. In some embodiments, the disclosed compositions may be used in supermarket refrigerator systems.

Therefore in accordance with the present invention, the compositions as disclosed herein containing Z-HFO-1336mzz may be useful in methods for producing cooling, producing heating, and transferring heat.

In one embodiment, a method is provided for producing cooling comprising evaporating any of the present compositions comprising Z-HFO-1336mzz in the vicinity of a body to be cooled, and thereafter condensing said composition.

In another embodiment, a method is provided for producing heating comprising condensing any of the present compositions comprising Z-HFO-1336mzz in the vicinity of a body to be heated, and thereafter evaporating said compositions.

In another embodiment, disclosed is a method of using the present compositions comprising Z-HFO-1336mzz as a heat transfer fluid composition. The method comprises transporting said composition from a heat source to a heat sink.

The compositions disclosed herein may be useful as low global warming potential (GWP) replacements for currently used refrigerants, including but not limited to R-123 (or HFC-123, 2,2-dichloro-1,1,1-trifluoroethane), R-11 (or CFC-11, trichlorofluoromethane), R-245fa (or HFC-245fa, 1,1,1,3,3-pentafluoropropane), R-114 (or CFC-114, 1,2-dichloro-1,1,2,2-tetrafluoroethane), R-236fa (or HFC-236a, 1,1,1,3,3,3-hexafluoropropane), R-236ea (or HFC-236ea, 1,1,1,2,3,3-hexafluoropropane), R-124 (or HCFC-124, 2-chloro-1,1,1,2-tetrafluoroethane), among others.

In many applications, some embodiments of the present compositions comprising Z-HFO-1336mzz are useful as refrigerants and provide at least comparable cooling performance (meaning cooling capacity and energy efficiency) as the refrigerant for which a replacement is being sought. Additionally, the compositions of the present invention provide heating performance (meaning heating capacity and energy efficiency) comparable to a refrigerant being replaced.

In another embodiment is provided a method for recharging a heat transfer system that contains a refrigerant to be replaced and a lubricant, said method comprising removing the refrigerant to be replaced from the heat transfer system while retaining a substantial portion of the lubricant in said system and introducing one of the present compositions comprising Z-HFO-1336mzz to the heat transfer system. In some embodiments, the lubricant in the system is partially replaced (e.g. replace a portion of the mineral oil lubricant used with for instance, HCFC-123 with a POE lubricant).

In another embodiment, the compositions of the present invention comprising Z-HFO-1336mzz may be used to top-off a refrigerant charge in a chiller. For instance, if a chiller using HCFC-123 has diminished performance due to leakage of refrigerant, the compositions as disclosed herein may be added to bring performance back up to specification.

In another embodiment, a heat exchange system containing any of the present compositions comprising Z-HFO-1336mzz is provided, wherein said system is selected from the group consisting of air conditioners, freezers, refrigerators, heat pumps, water chillers, flooded evaporator chillers, direct expansion chillers, walk-in coolers, heat pumps, mobile refrigerators, mobile air conditioning units, and systems having combinations thereof. Additionally, the compositions comprising Z-HFO-1336mzz may be useful in secondary loop systems wherein these compositions serve as the primary refrigerant thus providing cooling to a secondary heat transfer fluid that thereby cools a remote location.

Vapor-compression refrigeration, air-conditioning, or heat pump systems include an evaporator, a compressor, a condenser, and an expansion device. A vapor-compression cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator, by withdrawing heat from the environment, at a low temperature to form a vapor and produce cooling. The low-pressure vapor enters a compressor where the vapor is compressed to raise its pressure and temperature. The higher-pressure (compressed) vapor refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

In one embodiment, there is provided a heat transfer system containing any of the present compositions comprising Z-HFO-1336mzz. In another embodiment is disclosed a refrigeration, air-conditioning or heat pump apparatus containing any of the present compositions comprising Z-HFO-1336mzz. In another embodiment, is disclosed a stationary refrigeration or air-conditioning apparatus containing any of the present compositions comprising Z-HFO-1336mzz. In yet another embodiment is disclosed a mobile refrigeration or air conditioning apparatus containing a composition as disclosed herein.

In another embodiment, the present invention relates to foam expansion agent compositions comprising Z-HFO-1336mzz for use in preparing foams. In other embodiments the invention provides foamable compositions, and preferably thermoset (like polyurethane, polyisocyanurate, or phenolic) foam compositions, and thermoplastic (like polystyrene, polyethylene, or polypropylene) foam compositions and method of preparing foams. In such foam embodiments, one or more of the present compositions comprising Z-HFO-1336mzz are included as a foam expansion agent in foamable compositions, which composition preferably includes one or more additional components capable of reacting and/or mixing and foaming under the proper conditions to form a foam or cellular structure.

The present invention further relates to a method of forming a foam comprising: (a) adding to a foamable composition a composition comprising Z-HFO-1336mzz of the present invention; and (b) processing the foamable composition under conditions effective to form a foam.

Another embodiment of the present invention relates to the use of the compositions of the present invention comprising Z-HFO-1336mzz as propellants in sprayable compositions. Additionally, the present invention relates to a sprayable compositions comprising Z-HFO-1336mzz. The active ingredient to be sprayed together with inert ingredients, solvents and other materials may also be present in a sprayable composition. In one embodiment, a sprayable composition is an aerosol. The present compositions can be used to formulate a variety of industrial aerosols or other sprayable compositions such as contact cleaners, dusters, lubricant sprays, mold release sprays, insecticides, and the like, and consumer aerosols such as personal care products (such as, e.g., hair sprays, deodorants, and perfumes), household products (such as, e.g., waxes, polishes, pan sprays, room fresheners, and household insecticides), and automotive products (such as, e.g., cleaners and polishers), as well as medicinal materials such as anti-asthma and anti-halitosis medications. Examples of this includes metered dose inhalers (MDIs) for the treatment of asthma and other chronic obstructive pulmonary diseases and for delivery of medicaments to accessible mucous membranes or intra-nasally The present invention further relates to a process for producing aerosol products comprising the step of adding a composition of the present invention comprising Z-HFO-1336mzz to a formulation, including active, ingredients in an aerosol container, wherein said composition functions as a propellant. Additionally, the present invention further relates to a process for producing aerosol products comprising the step of adding a composition of the present invention comprising Z-HFO-1336mzz to a barrier type aerosol package (like a bag-in-a-can or piston can) wherein said composition is kept separated from other formulation ingredients in an aerosol container, and wherein said composition functions as a propellant. Additionally, the present invention further relates to a process for producing aerosol products comprising the step of adding only a composition of the present invention comprising Z-HFO-1336mzz to an aerosol package, wherein said composition functions as the active ingredient (e.g., a duster, or a cooling or freezing spray).

A process for converting heat from a heat source to mechanical energy is provided. The process comprises heating a working fluid comprising Z-HFO-1336mzz and at least one additional compound, and optionally at least one tracer compound and thereafter expanding the heated working fluid. In the process, heating of the working fluid uses heat supplied from the heat source; and expanding of the heated working fluid generates mechanical energy as the pressure of the working fluid is lowered.

The process for converting heat may be a subcritical cycle, a trans-critical cycle or a supercritical cycle. In a transcritical cycle, the working fluid is compressed to a pressure above its critical pressure prior to being heated, and then during expansion the working fluid pressure is reduced to below its critical pressure. In a super critical cycle, the working fluid remains above its critical pressure for the complete cycle (e.g., compression, heating, expansion and cooling).

Heat sources include low pressure steam, industrial waste heat, solar energy, geothermal hot water, low-pressure geothermal steam (primary or secondary arrangements), or distributed power generation equipment utilizing fuel cells or prime movers such as turbines, microturbines, or internal combustion engines. One source of low-pressure steam could be the process known as a binary geothermal Rankine cycle. Large quantities of low-pressure steam can be found in numerous locations, such as in fossil fuel powered electrical generating power plants. Other sources of heat include waste heat recovered from gases exhausted from mobile internal combustion engines (e.g. truck or rail diesel engines or ships), waste heat from exhaust gases from stationary internal combustion engines (e.g. stationary diesel engine power generators), waste heat from fuel cells, heat available at combined heating, cooling and power or district heating and cooling plants, waste heat from biomass fueled engines, heat from natural gas or methane gas burners or methane-fired boilers or methane fuel cells (e.g. at distributed power generation facilities) operated with methane from various sources including biogas, landfill gas and coal-bed methane, heat from combustion of bark and lignin at paper/pulp mills, heat from incinerators, heat from low pressure steam at conventional steam power plants (to drive "bottoming" Rankine cycles), and geothermal heat.

The process of this invention is typically used in an organic Rankine power cycle. Heat available at relatively low temperatures compared to steam (inorganic) power cycles can be used to generate mechanical power through Rankine cycles using working fluids as described herein. In the process of this invention, working fluid is compressed prior to being heated. Compression may be provided by a pump which pumps working fluid to a heat transfer unit (e.g., a heat exchanger or an evaporator) where heat from the heat source is used to heat the working fluid. The heated working fluid is then expanded, lowering its pressure. Mechanical energy is generated during the working fluid expansion using an expander. Examples of expanders include turbo or dynamic expanders, such as turbines, and positive displacement expanders, such as screw expanders, scroll expanders, and piston expanders. Examples of expanders also include rotary vane expanders.

Mechanical power can be used directly (e.g. to drive a compressor) or be converted to electrical power through the use of electrical power generators. In a power cycle where the working fluid is re-used, the expanded working fluid is cooled. Cooling may be accomplished in a working fluid cooling unit (e.g. a heat exchanger or a condenser). The cooled working fluid can then be used for repeated cycles (i.e., compression, heating, expansion, etc.). The same pump used for compression may be used for transferring the working fluid from the cooling stage.

Also provided is a method for detecting a leak from a container comprising sampling the air in the vicinity of the container and detecting at least one additional compound or at least one tracer compound with means for detecting the leak, wherein the composition of the present invention comprising HFO-1336mzz-Z is contained inside the container.

A container may be any known container or system or apparatus that is filled with HFO-1336mzz-Z. A container may include but is not limited to a storage container, a transport container, an aerosol can, a fire extinguishing system, a chiller apparatus, a heat pump apparatus, heat transfer container, and a power cycle apparatus (e.g., an organic Rankine cycle system).

Means for detecting a leak may be any known sensor designed to detect leaks. In particular, means for detecting the leak includes, but is not limited to, electrochemical, corona discharge and mass spectroscopic leak detectors.

By "in the vicinity of" the container is meant within 12 inches of the outside surface of the container. Alternatively, in the vicinity may be within 6 inches, within 3 inches or within one inch of the outside surface of the container.

Without further elaboration, it is believed that one skilled in the art can, using the description herein, utilize the present invention to its fullest extent. The following specific embodiments are, therefore, to be construed as merely illustrative, and do not constrain the remainder of the disclosure in any way whatsoever.

EXAMPLES

Example 1

Polyisocyanate-Based Foam Examples

To demonstrate effectiveness of low level chlorinated compounds in HFO-1336mzz-Z blowing agent, polyurethane and polyisocyanurate foam samples are prepared by hand-mixing, using the two basic polyurethane foam formulations described in Example 1A and Example 1B below. The blowing agents may be generally premixed with the polyol or B-side for convenience. Foams may be prepared either as free-rise or molded samples. For free-rise foams, the reaction mixture is poured into an open, round cardboard container. For molded foams, the reaction mixture is poured into a 2½"×13"×15" (6.35 cm×30.02 cm×38.1 cm) heated aluminum mold.

Example 1A

Polyisocyanurate Foam

All components except the isocyanate are premixed as a B-side. The isocyanate (A-side) is then added and mixed with a mechanical stirrer for 10 seconds. The foam reaction mixture is poured into a closed aluminum mold warmed to about 100° F. and allowed to expand. When cured, a 1"×1"×12" sample is cut from the core of the molded foam.

| Component | Parts by Weight Blowing Agent without chlorinated compounds | Blowing Agent with 0.9 wt % chlorinated compounds |
|---|---|---|
| aromatic polyester polyol | 120 | 120 |
| polysiloxane surfactant | 1.8 | 1.8 |
| potassium octanoate catalyst | 3.2 | 3.2 |
| Tris-2,4,6-(dimethylaminomethyl)phenol/Bis(di-methylaminomethyl)phenol catalyst | 0.4 | 0.4 |
| Z-1,1,1,4,4,4,4 Hexafluooro-2-butene (HFO-1336mzz-Z) Blowing Agent | 80 | 80 |
| polymethylene polyphenylisocyanate isocyanate | 190 | 190 |
| B-side Mixture | Slightly cloudy | Clear |
| Foam Density—pounds/ft$^3$ (PCF) | 2.2 | 2.1 |
| Cell structure | Uniform cell structure | Exceptionally fine cell structure |
| Dimensional Stability | Good | Good |
| R-value/inch at mean temperature of 75° F. | 7.4 | 8.5 |

Example 1B

Polyurethane Pour-in-Place Foam

All components except the isocyanate are premixed as a B-side. The isocyanate (A-side) is then added and mixed with a mechanical stirrer for 10 seconds. The foam reaction mixture is poured into a closed aluminum mold warmed to about 100° F. and allowed to expand. When cured, a 1"×1"×12" sample is cut from the core of the molded foam.

| Component | Parts by Weight Blowing Agent without chlorinated compounds | Blowing Agent with 0.9 wt % chlorinated compounds |
|---|---|---|
| sucrose/glycerine initiated polyether polyol | 140 | 140 |
| silicone surfactant | 3.0 | 3.0 |
| N,N-Dimethylcyclohexylamine catalyst | 1.7 | 1.7 |
| pentamethyldiethylenetriamine catalyst | 0.4 | 0.4 |
| 2-Methyl(n-methyl amino b-sodium acetate nonyl phenol) catalyst | 0.5 | 0.5 |
| Water | 2.1 | 2.1 |
| Z-1,1,1,4,4,4 Hexafluooro-2-butene (HFO-1336mzz-Z) Blowing Agent | 70 | 70 |
| polymethylene polyphenylisocyanate isocyanate | 169 | 169 |
| B-side Mixture | Slightly cloudy | Clear |
| Foam Density—pounds/ft³ (PCF) | 2.0 | 1.9 |
| Cell structure | Uniform cell structure | Exceptionally fine cell structure |
| Dimensional Stability | Good | Good |
| R-value/inch at mean temperature of 75° F. | 5.0 | 6.5 |

Example 2

Effect of Low Level Chlorinated Compounds on Aerosol Propellant Solubility

Unsaturated fluorocarbons exhibit different solubility than other typically used fluorocarbon propellants. Their reduced solubility can make it difficult to produce single phase aqueous homogenous aerosol formulations. The presence of low level chlorinated compounds can improve mixing and ease formulations and use of aerosol products.

Example 2A

55% VOC Hair Spray

A 55% VOC (volatile organic compound) hairspray is formulated as follows:

| | Wt % | |
|---|---|---|
| Ingredient | Propellant without chlorinated compounds | Propellant with 0.9 wt % chlorinated compounds |
| Octylacrylamide/acrylates/butylaminoethyl methylacrylate copolymer | 5 | 5 |
| AMP (2-amino-2-methyl-1-propanol) | 1 | 1 |
| Water | 3 | 3 |
| Ethanol | 47 | 47 |
| Z-HFO-1336mzz Propellant | 27 | 27 |
| Propane | 17 | 17 |
| Vapor Pressure @ 70° F. | 30 psig | 20 psig |
| Miscibility | The formulation does not mix easily and shows variable spray patterns and delivery. | The formulation is one phase indicating complete miscibility and shows good spray patterns and delivery. |

Example 2B

Air Freshener

An air freshener is formulated as follows:

| | Wt % | |
|---|---|---|
| Ingredient | Propellant without chlorinated compounds | Propellant with 1 wt % chlorinated compounds |
| Fragrance—mixed flower scent | 1 | 1 |
| Water | 3 | 3 |
| Ethanol | 24 | 24 |
| Z-HFO-1336mzz Propellant | 49 | 49 |
| Propane | 23 | 23 |
| Vapor Pressure @ 70° F. | 45 psig | 30 psig |
| Miscibility | The formulation does not mix easily and shows variable spray patterns and delivery. | The formulation is one phase indicating complete miscibility and shows good spray patterns and delivery. |

Example 2C

Fragrance

A fragrance is formulated as follows:

| | Wt % | |
|---|---|---|
| Ingredient | Propellant without chlorinated compounds | Propellant with 0.9 wt % chlorinated compounds |
| Perfume | 3 | 3 |
| Water | 10 | 10 |
| Ethanol | 54 | 54 |
| Z-HFO-1336mzz Propellant | 10 | 10 |
| Propane | 23 | 23 |
| Vapor Pressure @ 70° F. | 30 psig | 10 psig |
| Miscibility | The formulation does not mix easily and shows variable spray patterns and delivery. | The formulation is one phase indicating complete miscibility and shows good spray patterns and delivery. |

Example 3

It is critical to be able to identify leaks in refrigerant systems to avoid costly re-charging of refrigerant, ensure proper operation and prevent excessive environmental contamination.

Example 3A

Compositions of the present invention are prepared in a suitable container. A comparative composition that does not contain tracer compositions is also prepared. Compositions are then leaked in the vapor phase in the presence of a hand-held Ritchie Yellow Jacket® Accuprobe® heated electrochemical detector. The digital readout scale is 0 for no detection to 9 for maximum detection. Results are shown below.

| Composition | Detector Digital Reading |
| --- | --- |
| Z-HFO-1336mzz | 1 |
| Z-HFO-1336mzz/0.03 wt % HCC40 | 4 |
| Z-HFO-1336mzz/0.03 wt % HCFO-1223 | 4 |
| Z-HFO-1336mzz/0.03 wt % CFC-113a | 4 |
| Z-HFO-1336mzz/0.03 wt % CFC-113 | 4 |
| Z-HFO-1336mzz/0.03 wt % HCFC-123a | 4 |
| Z-HFO-1336mzz/0.03 wt % chlorobutane | 4 |
| Z-HFO-1336mzz/0.03 wt % HCFC-123 | 4 |
| Z-HFO-1336mzz/0.03 wt % HCFC-133a | 4 |
| Z-HFO-1336mzz/0.03 wt % HCFO-1122 | 4 |
| Z-HFO-1336mzz/0.03 wt % HCFO-1122a | 4 |
| Z-HFO-1336mzz/0.03 wt % HCFO-1335 | 4 |
| Z-HFO-1336mzz/0.03 wt % HCFO-1326 | 4 |

The data show that addition of additional compound/tracer improves the ability of the detector to detect a Z-HFO-1336mzz leak.

Example 3B

Compositions of the present invention are prepared in a suitable container. A comparative composition that does not include a tracer is also prepared. Compositions are then leaked in the vapor phase in the presence of a hand-held TIF Instruments 5650 corona discharge halogen leak detector and the detector reading are recorded based on number of red lights illuminated. Results are shown below.

| Composition | Detector Reading (number of red lights) |
| --- | --- |
| Z-HFO-1336mzz | 0 |
| Z-HFO-1336mzz/0.03 wt % HCC-40 | 6 |
| Z-HFO-1336mzz/0.03 wt % HCFO-1223 | 6 |
| Z-HFO-1336mzz/0.03 wt % CFC-113a | 6 |
| Z-HFO-1336mzz/0.03 wt % CFC-113 | 6 |
| Z-HFO-1336mzz/0.03 wt % HCFC-123a | 6 |
| Z-HFO-1336mzz/0.03 wt % chlorobutane | 6 |
| Z-HFO-1336mzz/0.03 wt % HCFC-123 | 6 |
| Z-HFO-1336mzz/0.03 wt % HCFC-133a | 6 |
| Z-HFO-1336mzz/0.03 wt % HCFO-1122 | 6 |
| Z-HFO-1336mzz/0.03 wt % HCFO-1122a | 6 |
| Z-HFO-1336mzz/0.03 wt % HCFO-1335 | 6 |
| Z-HFO-1336mzz/0.03 wt % HCFO-1326 | 6 |

The data show that addition of additional compound/tracer enables the detector to detect presence of a Z-HFO-1336mzz leak, whereas it is unable to detect the leak without tracer present.

What is claimed is:

1. A composition comprising Z-HFO-1336mzz and at least one additional compound selected from the group consisting of HCFO-1334 and HCFO-1333, wherein HCFO-1334 is E-HFO-1334mzz, Z-HFO-1334mzz, or combinations thereof; HCFO-1333 is E-HFO-1333mzz, Z-HFO-1333mzz, or combinations thereof, and wherein the composition contains less than about 1 weight percent of said at least one additional compound, based on the total weight of the composition.

2. The composition of claim 1 further comprising at least one tracer compound selected from the group consisting of HFC-356, HCFC-123, HCFC-133a, HFC-143a, HCFO-1122, HCFO-1122a, CFO-1316, HCFO-1335, HFO-1345, and HCFO-1326.

3. The composition of claim 1 comprising Z-HFO-1336mzz, HCFO-1335, and HCFO-1334.

4. The composition of claim 2 wherein the composition comprises from about 1 ppm to about 1000 ppm of the at least one tracer compound.

5. The composition of claim 2 wherein CFO-1316 is E-HFO-1316mxx, Z-HFO-1316mxx, or combinations thereof.

6. The composition of claim 2 wherein HCFO-1335 is E-HCFO-1335mzz, Z-HFO-1335mzz, E-HCFO-1335mzx, Z-HFO-1335mzx, or combinations thereof.

7. The composition of claim 2 wherein HFO-1345 is E-HFO-1345mzz, Z-HFO-1345mzz, HFO-1345 cm, or combinations thereof.

8. The composition of claim 2 wherein HCFO-1326 is E-HFO-1326mxz, Z-HFO-1326mxz, or combinations thereof.

9. The composition of claim 1 wherein the at least one additional compound is HCFO-1334.

10. The composition of claim 1 wherein the at least one additional compound is HCFO-1333.

11. A method for producing cooling comprising evaporating the composition of claim 1 in the vicinity of a body to be cooled, and thereafter condensing said composition.

12. A method for producing heat comprising condensing the composition of claim 1 in the vicinity of a body to be heated, and thereafter evaporating said composition.

13. A method of forming a foam comprising: (a) adding to a foamable composition the composition of claim 1; and (b) processing the composition produced in step (a) under conditions effective to form a foam.

14. A process for producing aerosol products comprising the step of adding the composition of claim 1 to a formulation, including active ingredients in an aerosol container, wherein said composition functions as a propellant.

15. A process for converting heat to mechanical energy comprising heating a working fluid comprising the composition of claim 1 and thereafter expanding the heated working fluid.

* * * * *